United States Patent [19]
Roman et al.

[11] 3,955,897
[45] May 11, 1976

[54] BORING BAR ASSEMBLY IMPROVEMENT

[75] Inventors: Joseph M. Roman, Zelienople, Pa.;
Albert Thomas, Fairfax, Va.

[73] Assignee: Joseph M. Roman, Zelienople, Pa.

[22] Filed: Oct. 29, 1974

[21] Appl. No.: 518,802

[52] U.S. Cl.................................. 408/186; 408/153
[51] Int. Cl.².......................................... B23B 51/00
[58] Field of Search .......... 408/187, 153, 180, 150, 408/151, 162, 186, 238; 279/6, 1 ME, 1 A; 82/2 E; 144/24

[56] References Cited
UNITED STATES PATENTS

| | | | |
|---|---|---|---|
| 1,718,089 | 6/1929 | Tesoroni................................. | 279/6 |
| 1,960,124 | 5/1934 | Russell.................................... | 279/6 |
| 2,438,607 | 3/1948 | Jackson .................................. | 279/6 |
| 2,489,719 | 11/1949 | Myers..................................... | 279/6 X |
| 3,014,391 | 12/1961 | Fuhrman............................... | 279/6 X |

FOREIGN PATENTS OR APPLICATIONS

| | | | |
|---|---|---|---|
| 170,542 | 3/1960 | Sweden.................................. | 279/6 |

*Primary Examiner*—Othell M. Simpson
*Assistant Examiner*—W. R. Briggs
*Attorney, Agent, or Firm*—Paul Bogdon

[57] ABSTRACT

An improvement in a boring bar assembly is disclosed. The improvement relates to a lateral bar assembly in combination with the adjustable boring bar assembly of U.S. Pat. No. 2,838,316 issued to Albert Thomas, a co-inventor of the present invention. The improvement includes a lateral bar to which a major portion of the shank member of the boring bar assembly is removably fixed. The lateral bar has a plurality of longitudinally spaced threaded receptacles into which an end of the shank may be screwed. The shank may be selectively screwed into the lateral bar to thereby change the diameter of the boring bar assembly. The lateral bar may be varied in overall length with the number of receptacles likewise varied to thus vary the magnitude of the ranges of diameters of operation of the boring bar assembly.

3 Claims, 3 Drawing Figures

BORING BAR ASSEMBLY IMPROVEMENT

BACKGROUND OF THE INVENTION

This invention relates to an improvement in an adjustable boring bar assembly and particularly to a lateral bar assembly improvement of the invention disclosed and claimed in U.S. Pat. No. 2,838,316 issued to Albert Thomas, a co-inventor of the present invention, and assigned to Joseph M. Roman, the other co-inventor of this invention.

The lateral bar improvement of this invention permits the use of a multi-diameter single boring bar assembly, such as are used with on lathes, milling machines, or boring mills. As is well known boring bar assemblies are limited in the range of diameters over which they may operate. In a typical operation using a single boring bar assembly, the small diameters of operation are achieved by a cutting tool mounted axially in a bit holder. To get larger diameter operation with that same boring bar assembly the bit holder is replaced with another holder adapted to support a bit which extends generally radially of the bit holder. The range of diameters acheived in that manner is limited to a small range. Should larger diameters be needed an altogether different and larger boring bar assembly would be required. Thus, a wide range of diameters may only be achieved by having multiple boring bar assemblies. Boring bar assemblies, as is well known, are very expensive and having to stock a number of different sized boring bar assemblies is financially burdensome on machine shop operators. In addition, much valuable time is expended by operators when having to change boring bar assemblies. Another problem exists with using progressively larger boring bar assemblies and that is that as the boring bar assembly increases in physical size the machine speed must be slowed down to accommodate the larger sizes thus slowing down production speed.

The present invention overcomes the above noted deficiencies in obtaining a wide range of boring bar assembly diameters by providing a lateral bar arrangement made integrally with the boring bar assembly structure disclosed in U.S. Pat. No. 2,838,316. This lateral bar improvement permits operating over a wide range of boring bar diameters while maintaining the compact structure of the assembly disclosed in said patent. Also by virtue of the improvement of this invention the range of diameters is achieved on a single assembly by simply repositioning the assembly along receptacles provided on the lateral bar. Thus, the improvement of the present invention permits the wide range of diameters to be achieved quickly on a simple structure forming part of a compact boring bar assembly without the need of completely replacing assemblies and without having to slow down production by having to reduce the speed of the machine.

SUMMARY OF THE INVENTION

The present invention provides an improved adjustable boring bar assembly, the basic structure of which is disclosed and claimed in U.S. Pat. No. 2,838,316, and which includes end-to-end juxtaposed shank and bit holder members, the end faces of the members having transversely extending semi-cylindrical grooves formed in the juxtaposed end faces thereof, the grooves defining a transverse bore between the members; a housing for holding the members together but permitting relative transverse movement thereof axially of the bore; an adjustable screw rotatable in the bore; key means axially fixing the screw with respect to one of the members; a nut threaded on the screw for axial movement relative to one of the members; key means holding the nut against rotation in the bore and against axial movement with respect to the other of the members, the members are moved transversely with respect to one another; and the screw and the nut are fitted into the bore to constitute the sole torque resisting means to key the members against relative rotary movement. The inventive improvement that is combined with the above structure is a lateral adjustment assembly comprising an elongated lateral bar having one end thereof fixed to either of the shank or bit holder members at a position adjacent the housing, the lateral bar having a plurality of longitudinally spaced receptacles in the face thereof disposed away from the housing; the member to which the lateral bar is fixed is formed of two sections at least one of which is formed to be removably secured to the lateral bar in any of the receptacles; the receptacles being arranged with respect to each other in such a manner that the boring assembly operates stably in any relationship of the member in any respective receptacles.

In its preferred form of the lateral bar improvement of the present invention, the receptacles in the lateral bar are threaded holes into which may be screwed the inner end portion of the shank member. The lateral bar is fixed on the back or inner end of the inner section of the shank member, that is the section which is ordinary positioned within the housing of the assembly. Thus, whenever it is desired to increase the diameter of operation of the boring bar assembly, the shank may be left in place on the machine, the remainder of the assembly screwed off of the shank, and the lateral bar moved to the next receptacle and simply screwed onto the shank.

Various other advantages, details, and modifications of the present invention will become apparent as the following description of a present preferred embodiment thereof proceeds.

BRIEF DESCRIPTION OF THE DRAWING

In the accompanying drawing I have shown a present preferred embodiment of the present invention in which.

Figure 1:
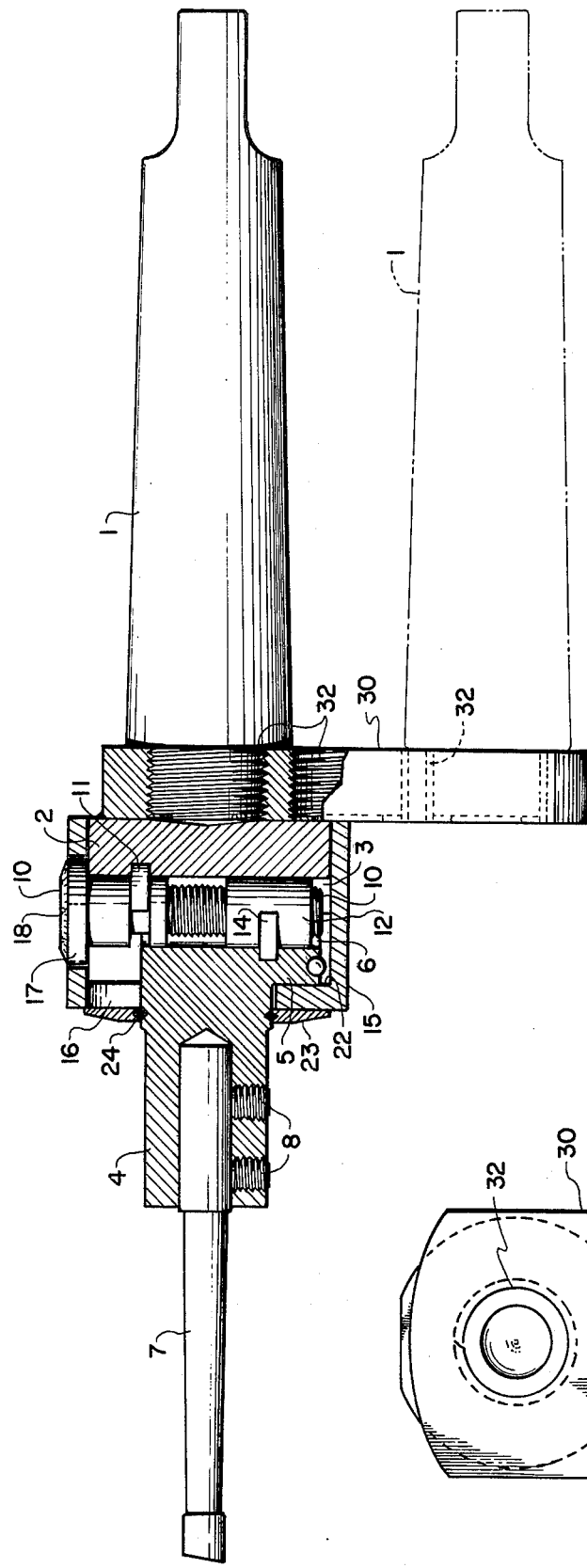
FIG. 1 is a side longitudinal cross-section view of an embodiment of the improvement of this invention showing in phantom outline the shank portion secured in a different position of the lateral bar as compared with the shank shown in solid outline.
Figure 3:
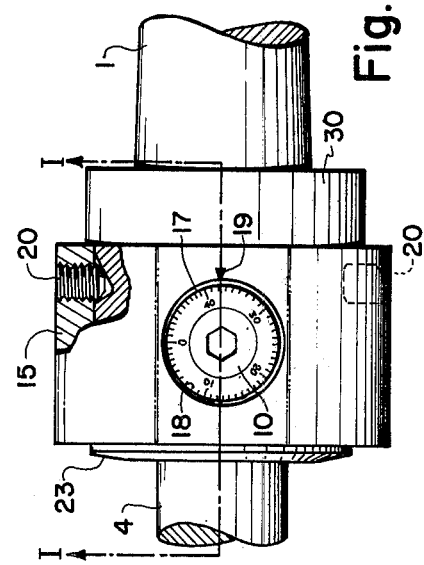
FIG. 3 is an elevation view, partly in section, as viewed downwardly from the top of FIG. 1.
Figure 2:
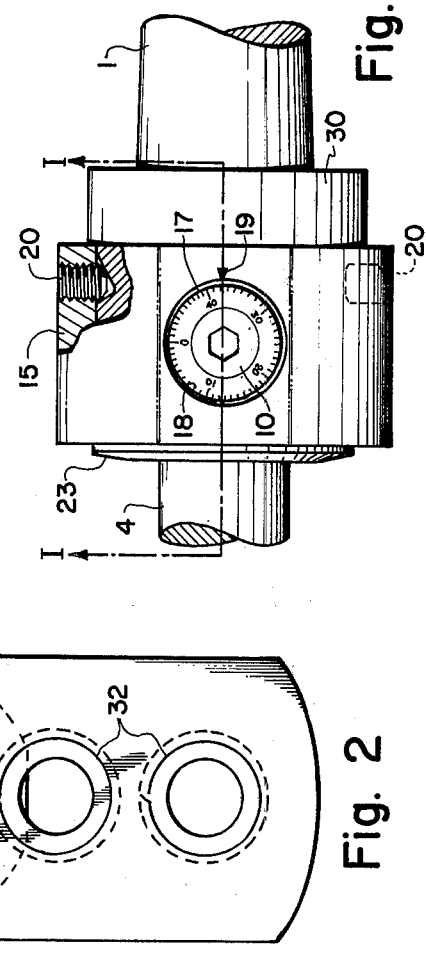
FIG. 2 is an end elevation view of the lateral bar forming part of the improvement of the present invention.

Referring now to the drawings, there is shown an adjustable boring bar assembly, the basic elements of which are fully described and illustrated in U.S. Pat. No. 2,838,316. The details set forth in that Patent are incorporated by reference into this specification.

The adjustable boring bar assembly comprises a shank 1 and a head 2 formed at its inner end with a semi-cylindrical groove 3 diametrically thereacross. The bit holder 4 has an eliptically shaped head 5 formed with a semi-cylindrical groove 6 complemental to groove 3 so as to form a transverse bore with groove 3. The bit holder 4 has a boring bit 7 secured thereto by means of set screws 8.

An adjusting screw 10 is rotatable in the bore defined by the mating grooves 3 and 6 but is axially fixed therein by a semi-annular washer 11 which engages a peripheral groove formed in screw 10 and in an annular groove in shank head 2.

A nut 12 is fitted in the bore defined by grooves 3 and 6 and is in threaded engagement with the screw 10. The nut 12 is held against rotation and axial movement by a washer 14 which is engaged in a peripheral groove extending half-way around the nut and in a semi-annular groove formed in the bit holder 4.

A housing 15 is provided which surrounds the heads 2 and 5, the housing being formed with a slot 16 to accommodate the radial movement of the bit holder 4 which projects through the slot. The housing 15 is also provided with a hole 17 in which the head of the adjusting screw 10 is rotatable, the latter being formed with radial indicia 18 cooperating with mark 19 formed on the housing.

The housing 15 serves to clamp the head 2 and the bit holder head 5 in juxtaposed end-to end relationship through oppositely arranged conical point screws 20 which engage the inclined walls of recesses 21 formed in the periphery of head 2.

The bit holder 4 has a dust cover 23 detachably secured thereto by means of a snap ring 24, the dust cover being juxtaposed to the end of the housing 15 to overlie the slot 16 in all positions of the bit holder 4 to thereby prevent foreign matter from entering the housing.

The procedure for disassembling the boring bar assembly and the operation of the adjusting mechanism are fully described in the aforementioned patent.

The improvement of the present invention is a lateral adjustment assembly which permits the boring bar assembly just described to be operated over a wide range of diameters. The lateral adjustment assembly includes an elongated flat lateral bar 30 having a plurality of threaded receptacles 32, three of which are shown in the illustrated embodiment although the invention is not limited to that number. The receptacles 32 are cylindrically shaped and are longitudinally spaced along the axis of the lateral bar. The inner end of the shank 1 is shaped and appropriately threaded to be screwed into any of the receptacles 32. Thus, by screwing the shank 1 in different receptacles 32, the diameter at which the boring bit 7 will operate will accordingly vary.

The lateral bar 30 is shown integrally fixed with the head 2 with one of the receptacles 32 being coaxial with the head whereby the shank 1 and head 2 thereby being coaxial when the shank is screwed into the coaxial receptacle. The lateral bar 30 may be secured in any appropriate manner to the head 2 and if desired could be made removable from the head. Alternatively, the lateral bar 30 could be fixed to the shank 1 and removably secured to the head 2.

In the embodiment shown, it should be apparent that regardless of which receptacle the shank 1 is screwed into, the respective axes of the shank 1, lateral bar 30, and cutting edge of the bit 7 are in a common plane thus insuring proper cutting by the bit 7 at whichever diameter is selected. It should also be apparent that the lateral bar assembly improvement of this invention may be used with the type bit holder that holds a bit at a radial position in its end section. Such a bit holder is shown in the aforementioned patent and identified by the numeral 25.

It should now be clearly understood how the advantages of the improvement of the present invention as specified in the introductory portion of this specification are achieved. There should be no doubt of the simplicity of the invention and the results which flow therefrom.

While we have shown and discribed a present preferred embodiment of this invention, it is to be distinctly understood that the invention is not limited thereto, but may be otherwise variously embodied within the scope of the following claims.

We claim:

1. In combination with a boring bar assembly including shank and bit holder members, and a housing for holding said bit holder and permitting relative transverse movement of said bit holder, the improvement therewith being a lateral adjustment assembly comprising an elongated lateral bar member fixed at one end portion thereof to said housing at the end of said housing away from said bit holder with the longitudinal axis of said lateral bar extending transversely of the axis of said bit holder; said lateral bar having a plurality of longitudinally spaced threaded receptacles defined in the face thereof disposed away from said housing the axes of said threaded receptacles being generally parallel; said shank member having a threaded end section sized to be selectively secured to said lateral bar within any one of said receptacles; and said receptacles being arranged with respect to each other in such a manner that said boring bar assembly operates stably in any relationship of said shank in any of respective receptacles.

2. The lateral adjustment assembly improvement as set forth in claim 1, wherein said receptacles are aligned longitudinally of said lateral bar.

3. The lateral adjustment assembly improvement as set forth in claim 1, wherein one of said receptacles is coaxially aligned with said bit holder.

* * * * *